Figure 1:
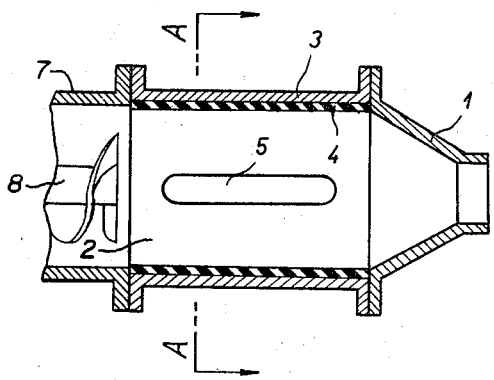

March 12, 1968 K. MAURER ET AL 3,372,445
PRESS FOR DRAWING CERAMIC AND OTHER MATERIALS
IN THE PLASTIC STATE
Filed Sept. 16, 1965

INVENTORS
Karel Maurer, Jindřich Hiršl, La-
dislav Benda, Juda Sternküker
BY Richard Grub agent United States Patent Office 3,372,445
Patented Mar. 12, 1968

3,372,445
PRESS FOR DRAWING CERAMIC AND OTHER MATERIALS IN THE PLASTIC STATE
Karel Maurer, Jindrich Hirsl, and Ladislav Benda, Hradec Kralove, and Juda Sternküker, Prague, Czechoslovakia, assignors to Tesla, narodni podnik, Prague, Czechoslovakia
Filed Sept. 16, 1965, Ser. No. 487,725
Claims priority, application Czechoslovakia, Oct. 1, 1964, 5,445/64
3 Claims. (Cl. 25—11)

The invention relates to a press for extruding ceramic and other materials in the plastic state, for example from an extrusion press of the screw conveyor type, using for example the method disclosed in our copending application Ser. No. 336,697, filed on Jan. 9, 1964, and now abandoned.

The invention disclosed in the above mentioned patent specification describes a method of, and device for, predrying ceramic material before the same is separated from the mouth of the press from which the material is being drawn or extruded in the plastic state, more particularly ceramics, porcelain, stoneware, and the like. The disclosed invention is characterized by the fact that the extruded mass passes through a space in which there is an electric field or an electromagnetic field which can supply heat directly into the entire cross section of the drawn mass. The device in accordance with the disclosed invention comprises transmission elements, for example electrodes or induction coils supplied with a voltage. Between the electrodes is created an electric heating field of the current or electromagnetic type.

The present invention relates to a device of the type disclosed in the cited application using electrodes inside the heating space.

The invention relates more particularly to improvements in the construction of the electrodes of such a press.

It is an object of the invention to provide a press of the type mentioned in which the electrodes are so shaped and arranged as to allow the extrusion of profiles of certain materials in the elastic state of a diameter exceeding about 20 mm.

If small compact profiles having a diameter of approximately up to 20 mm. are extruded, the arrangement and location of the electrodes in the press is not critical. Any convenient arrangement may be used. The situation becomes more difficult when larger diameters are extruded. The difficulties arising in this case are due to the fact that the central parts of the extruded material move faster than the peripheral ones, and the distribution of the intensity of the electric field is not uniform. The drawn mass is heated unevenly which is a serious disadvantage in some cases and may affect unfavourably the quality of the extruded material.

It is therefore another object of the invention to eliminate these drawbacks of the known state of art.

Stated briefly but more specifically, the press in accordance with the invention is characterized by a heating space created between the extruded orifice and the transportation mechanism of the press, and by a tube made of an electrically insulating material and located in the said space, at least three elongated electrodes being attached to the inner wall of the said tube, the exposed conductive faces of these electrodes being symmetrically distributed with respect to the longitudinal axis of the heated space, and their longitudinal axes being inclined at an angle from 0° to 30° relative to the axis of the heated space.

The term "transportation mechanism of the press" indicates a piston or conveyor screw.

It has been found advantageous that the electrodes on the inner wall of the insulating tube about the heating space extend into this space. Care should be taken that the protruding electrodes do not substantially narrow the heating space to prevent undesirable concentration of the electrical heating field which might cause local overheating of the extruded material.

The electrodes formed and located in this manner are connected through a variable transformer with a three-phase mains distribution system. Several presses may be connected with one transformer of this type.

When a hollow profile is to be extruded, a mandrel of a suitable diameter is placed in the centre of the heating space. This mandrel extends to the orifice of the press. If the mandrel is made of a conductive material, or at least coated with conductive material, it is connected with a grounded pole of the current source.

Figure 2:
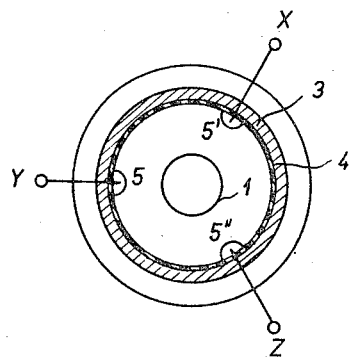
Figure 3:
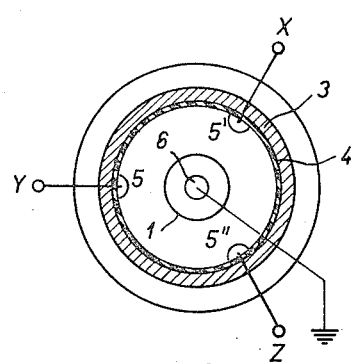

The above mentioned and other objects and features of the invention will be best understood from the following specification to be read in conjunction with the accompanying drawings illustrating preferred embodiment. In the drawings:

FIG. 1 shows a press of the invention in axial section;
FIG. 2 is a section in the direction A—A in FIG. 1;
FIG. 3 illustrates an embodiment of the invention with a mandrel for hollow profiles in the manner of FIG. 2; and
FIG. 4 illustrates a portion of a modified press having electrodes arranged at an angle to the longitudinal axis of the heating space.

Referring now more particularly to the figures, 1 denotes the tapering extrusion nozzle of the press, 2 is the heating space formed by the tube 3 in the inner space of which is located an insulating tube 4. Three axially elongated inwardly protruding electrodes 5, 5', 5" are attached to the insulating tube 4. FIGS. 2 and 3 illustrate also schematically how the electrodes may be connected to the three phases X, Y, Z of the supply mains.

The embodiment according to FIG. 3 is provided with a mandrel 6 in the center of the heating space. This mandrel is made from a conductive material and it is connected with the mass of the press, as illustrated in the figure by the ground symbol.

Figure 4:
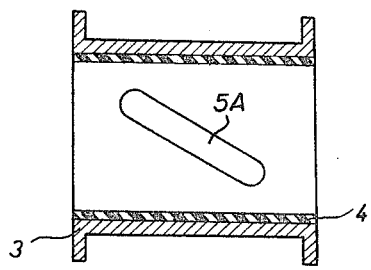

In FIG. 4 in which the reference symbols 3 and 4 have the same meaning as in FIG. 1, the longitudinal axis of each electrode 5a is inclined at an angle of 30° to the axis of the heated space, only one electrode being shown.

The longitudinal edges of the electrodes according to FIGS. 2 and 3, which protrude from the wall of the carrier tube 4, are rounded where they are in contact with the extruded material during operation of the press. This prevents local concentration of the intensity of the electrical field, and thus also local overheating of, and damage to, the extruded material.

The heating space arranged in accordance with the invention forms either an integral part of the press, or it may also be built-in into a special device which may be connected to the press only if required.

The several tubes 2 shown in FIGS. 1, 3, and 4 are attached to the discharge ends of respective screw conveyors mainly consisting of a tubular casing 7 and a rotary screw 8 in the casing, as is shown in FIG. 1 only. When a plastic material such as a ceramic mass is fed to the screw conveyor, it is forced sequentially through the heating space 2 and the nozzle 1, and discharged through the orifice of the latter.

What we claim is:
1. In a press for extruding ceramic material in the plastic state and for predrying the material before it is separated from the press, in combination:
(a) tubular means defining a heating space therein, said space having an axis;

(b) a tube of insulating material in said space about said axis; and (c) at least three electrodes having respective faces elongated in an axially extending direction and arranged on said tube in angularly offset relationship symmetrically relative to said axis, the direction of elongation of each face being inclined relative to said axis at an angle of 0 to 30 degrees;

(d) nozzle means defining an extrusion orifice;

(e) conveyor means, said tubular means being interposed between said conveyor means and said nozzle means for conveying of a material from said conveyor means in a path extending axially through said tube in said heating space and outward of said orifice of said nozzle means, said faces being exposed to the conveyed material in said space;

(f) a source of polyphase electric current; and (g) means connecting each of said electrodes to one phase of said source.

2. In a press for extruding ceramic material in the plastic state and for predrying the material before it is separated from the press, in combination:

(a) tubular means defining a heating space therein, said space having an axis;

(b) a tube of insulating material in said space about said axis;

(c) at least three electrodes having respective faces elongated in an axially extending direction and arranged on said tube in angularly offset relationship symmetrically relative to said axis, (1) the direction of elongation of each face being inclined relative to said axis at an angle of 0 to 30 degrees, (2) respective portions of said faces protruding radially inward from said tube of insulating material into said path;

(d) nozzle means defining an extrusion orifice; and (e) conveyor means, said tubular means being interposed between said conveyor means and said nozzle means for conveying of a material from said conveyor means in a path extending axially through said tube in said heating space and outward of said orifice of said nozzle means, (1) said faces being exposed to the conveyed material in said space.

3. In a press as set forth in claim 2, each of said portions including a longitudinal edge of the corresponding electrode, said edge being rounded in a plane transverse of said axis.

References Cited

UNITED STATES PATENTS

| | | | |
|---|---|---|---|
| 1,074,638 | 10/1913 | Moltz. | |
| 2,032,624 | 3/1936 | Lyons | 264—22 |
| 2,032,624 | 3/1936 | Lyons | 264—22 |
| 2,849,312 | 8/1958 | Peterman. | |
| 2,906,596 | 9/1959 | Ballhausen | 18—12 X |
| 3,212,311 | 10/1965 | Kiyoshilnove. | |

WILLIAM J. STEPHENSON, *Primary Examiner.*

J. SPENCER OVERHOLSER, *Examiner.*